United States Patent [19]

Gerber

[11] Patent Number: 5,002,216
[45] Date of Patent: * Mar. 26, 1991

[54] INVISIBLE MOUNT ROOF RACK

[75] Inventor: Gary A. Gerber, Weston, Conn.

[73] Assignee: Gerber Group Ltd., Weston, Conn.

[ * ] Notice: The portion of the term of this patent subsequent to Aug. 22, 2006 has been disclaimed.

[21] Appl. No.: 384,655

[22] Filed: Jul. 21, 1989

Related U.S. Application Data

[63] Continuation-in-part of Ser. No. 74,521, Oct. 16, 1987, Pat. No. 4,858,803.

[51] Int. Cl.$^5$ .............................................. B60R 9/04
[52] U.S. Cl. .................................... 224/329; 224/315; 224/320; 224/322; 224/327; 296/213
[58] Field of Search .............. 224/309, 314, 315, 320, 224/321, 322, 323, 324, 327, 329, 330, 331; 296/213

[56] References Cited

U.S. PATENT DOCUMENTS

| 3,385,488 | 5/1968 | Bronson | 224/329 |
| 4,354,625 | 10/1982 | Peoples | 224/329 |
| 4,382,532 | 5/1983 | Pflugfelder | 224/331 |
| 4,410,211 | 10/1983 | Kloppe et al. | 296/213 |
| 4,456,158 | 6/1984 | Wertz et al. | 224/324 X |
| 4,473,178 | 9/1984 | Bott | 224/324 |
| 4,627,559 | 12/1986 | Anderson | 224/329 |
| 4,723,696 | 2/1988 | Stichweh et al. | 224/331 |
| 4,746,042 | 5/1988 | King | 224/197 |
| 4,858,803 | 8/1989 | Gerber | 224/329 |

FOREIGN PATENT DOCUMENTS

| 0278435 | 8/1988 | European Pat. Off. | 224/309 |
| 0324914 | 7/1989 | European Pat. Off. | 224/309 |
| 2551646 | 6/1977 | Fed. Rep. of Germany | 224/309 |
| 2908682 | 9/1980 | Fed. Rep. of Germany | 224/309 |
| 3032099 | 8/1982 | Fed. Rep. of Germany | 224/309 |
| 3614740 | 11/1987 | Fed. Rep. of Germany | 224/309 |
| 189332 | 5/1937 | Switzerland | 224/329 |
| 2147860 | 5/1985 | United Kingdom | 224/309 |

Primary Examiner—Ernest G. Cusick
Attorney, Agent, or Firm—St.Onge Steward Johnston & Reens

[57] ABSTRACT

A roof rack mounting system for vehicle having concealed drip moldings in mounting plates are riveted to the roof return of a vehicle, on opposite sides of the vehicle underneath a vehicle upper door lip. Each mounting plate has two pins which fit into cups or slots formed on a foot plate. A leg section connects each foot plate to a hollow transverse beam. One leg section is movable and has a screw extending through the leg section and engaging a nut secured to the inside of the tranverse beam.

18 Claims, 6 Drawing Sheets

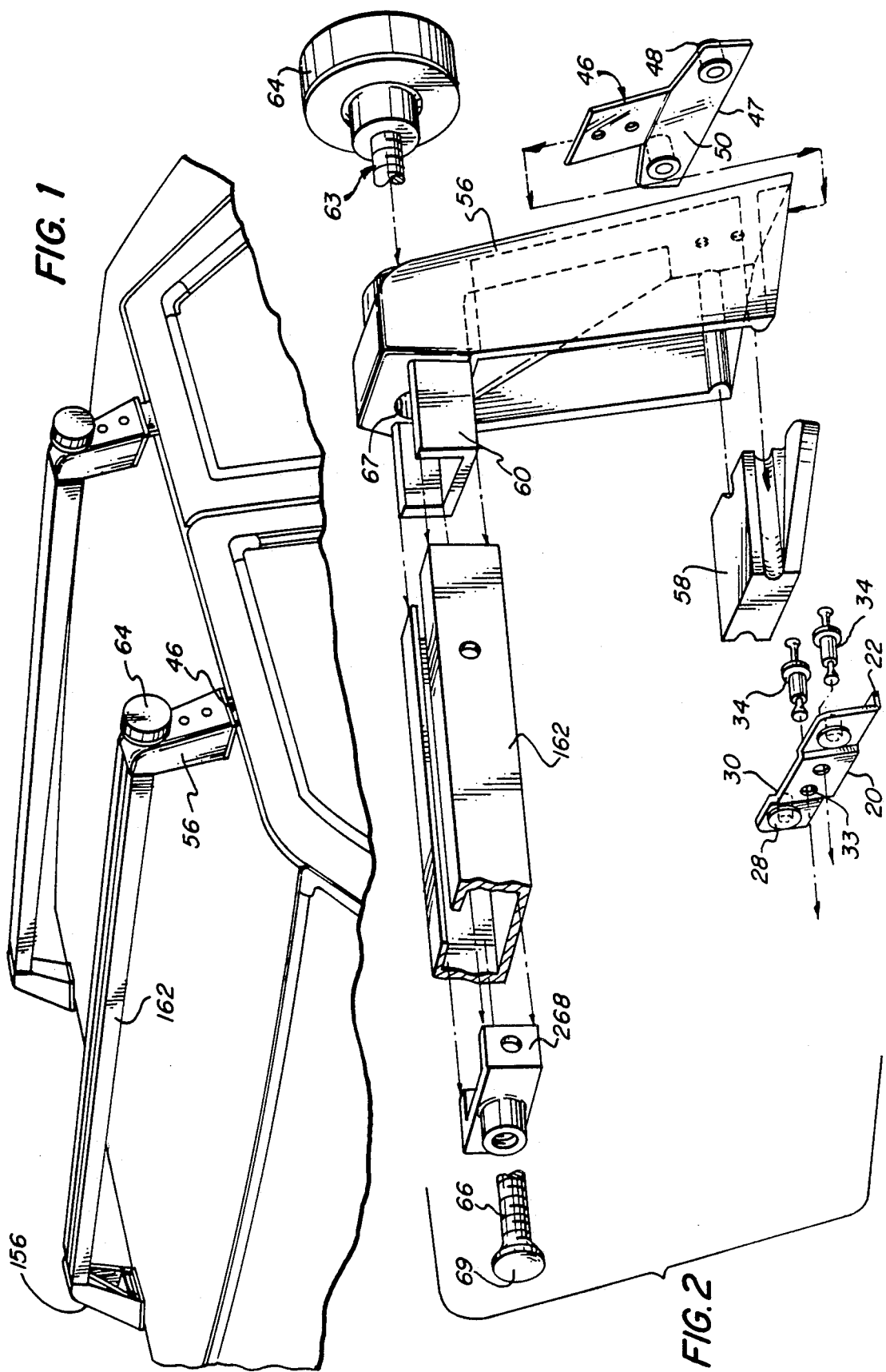

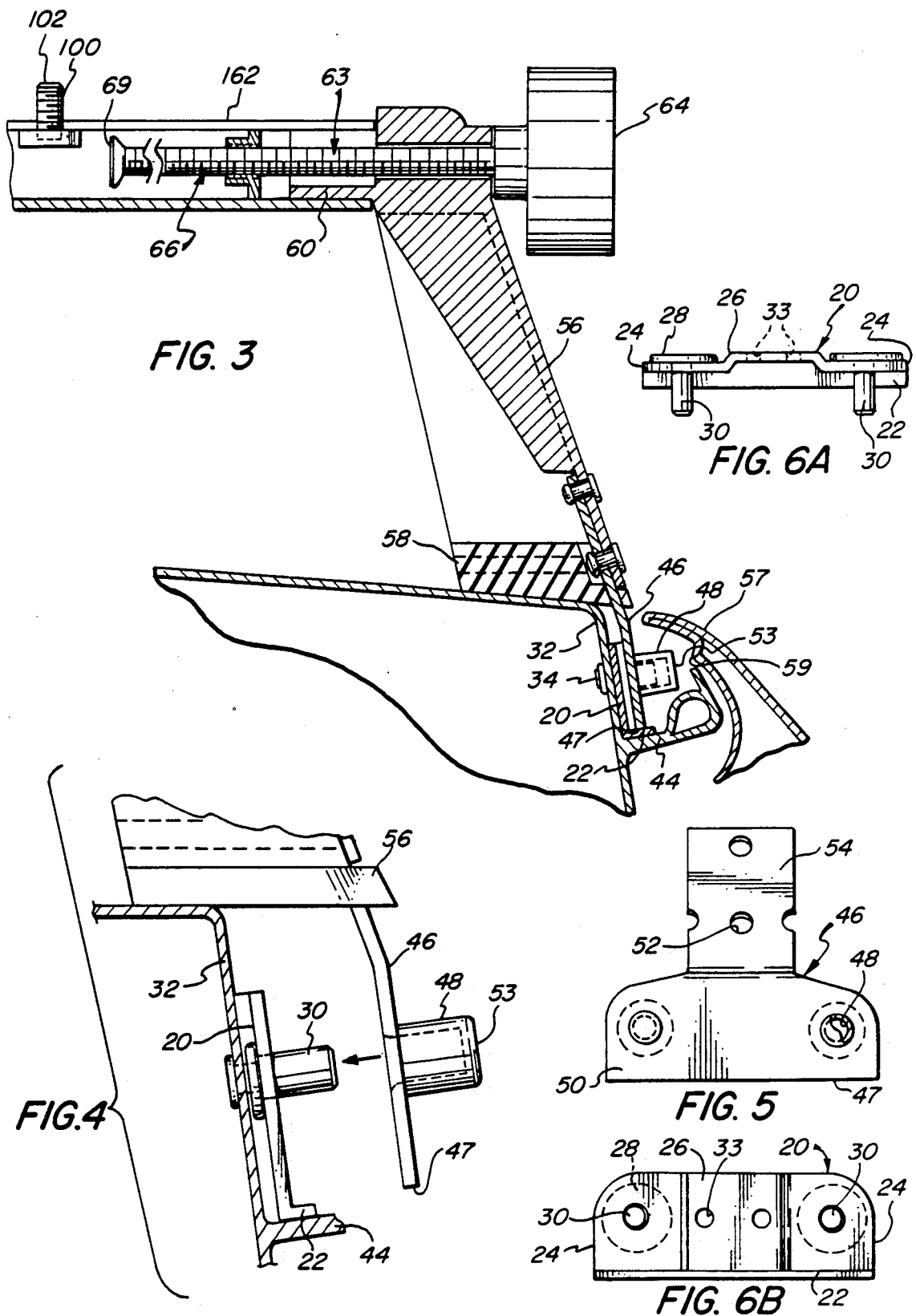

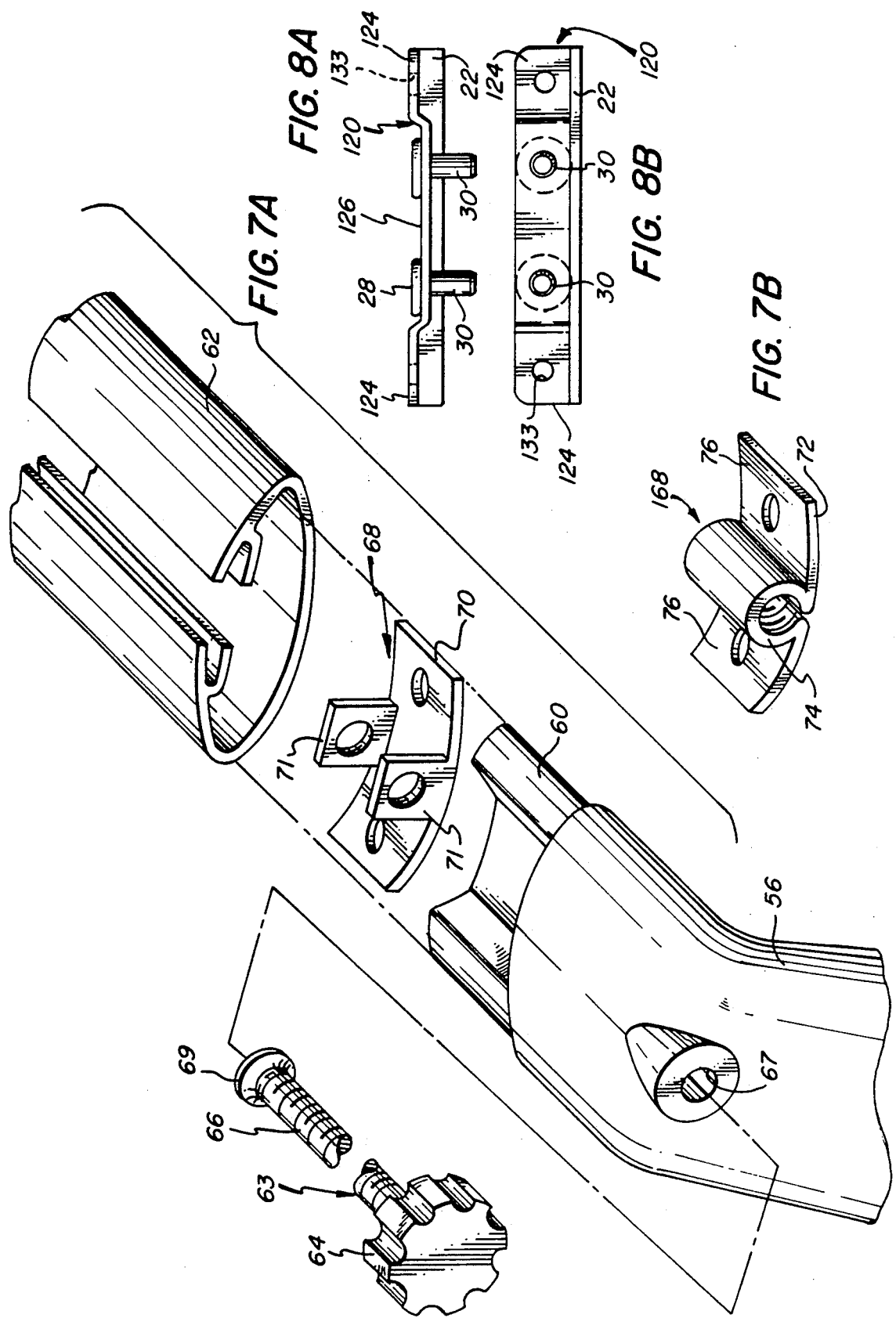

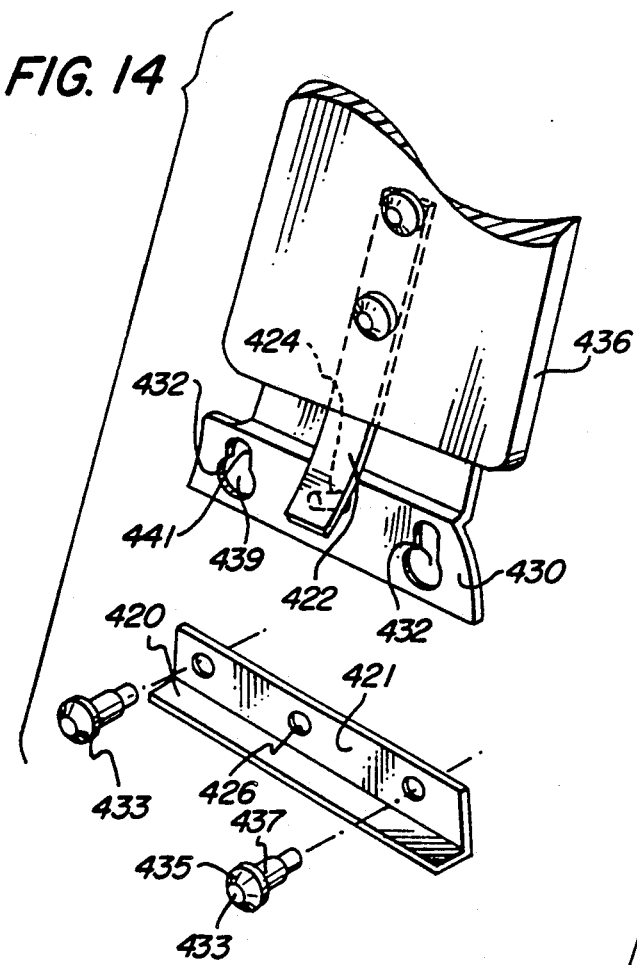
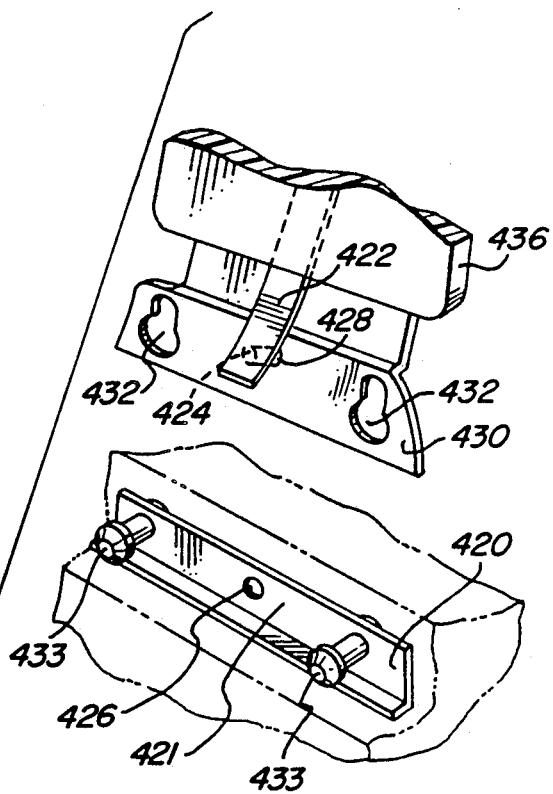

INVISIBLE MOUNT ROOF RACK

The present application is a continuation-in-part of U.S. Ser. No. 07/074,521, filed July 16, 1987, U.S. Pat. No. 4,858,803.

FIELD OF THE INVENTION

The present invention relates to an improved roof rack for use with automobiles and other vehicles having concealed drip moldings.

The typical roof rack system has primarily used a clamp of some kind to clamp the leg of a roof rack to the rain gutters of a vehicle. Typical of such devices is U.S. Pat. No. 3,385,488 for a Clamping Device. However, such roof rack systems are ineffective when used to mount a roof rack on a vehicle having a concealed drip molding. Concealed drip moldings, such as the design shown in U.S. Pat. No. 4,410,211 to Kloppe for a Motor Vehicle Body with Concealed Drip Rail, have become a frequently used alternative to rain gutters because the concealed drip molding allows a sleeker vehicle design and improves aerodynamics. However, the concealed drip molding does not provide a convenient and sturdy railing necessary to mount a roof rack using the methods of the prior art.

BACKGROUND ART

Several designs have been proposed to allow the mounting of a roof rack to a vehicle roof. One such design, in the previously mentioned U.S. Pat. No. 4,410,211 to Kloppe discloses a support bracket having an outwardly extending loop, which is mounted on the roof return of a vehicle roof by screws inserted through the roof return and into a backing plate which is permanently mounted inside the vehicle roof return. A leg of a roof rack is inserted into the loop of the support bracket and a hooked element on the leg engages and presses outwardly against the bracket loop. The disadvantage of the Kloppe design is that the backing plate must be mounted inside the vehicle roof while the vehicle is being manufactured, and is therefore unsuitable for aftermarket use. In addition, the outward force of the hook element when tightened onto the bracket would be likely to unseat a bracket plate which was not securely mounted using a backing plate.

Another roof rack design which has been adapted for vehicles having concealed drip moldings is U.S. Pat. No. 4,627,559 to Andersson for a Roof Rack for A Vehicle. Andersson discloses a roof rack support system in which holes are drilled into the roof return on each side of a vehicle with a bushing fitted into each hole. The foot of each end of a roof rack has two inwardly directed pins which fit into these holes. The feet are clamped against the vehicle by the action of a turnbuckle mounted in the center of a telescoping beam.

The disadvantage of this design is that the use of holes drilled into sheet metal, even with the disclosed bushings, provides an insecure attachment for the feet of the roof rack. The constant insertion and removal of the pins through the sheet metal of the roof return holes associated with mounting and dismounting the rack will have a tendency to widen the holes, and loosen the bushings, until the holes are to large to retain the pins. A related problem is that a heavy load on the roof rack will tend to distort the sheet metal of the roof return, causing the holes to widen, and damaging to the vehicle by allowing water to leak into the body or shell of the vehicle.

In addition, the holes of the Andersson design must be precisely located and drilled so that the pins fit into them.

The prior art thus has not provided a roof rack mounting system which is easily installed as an aftermarket addition, and which provides the strength and security of a factory installed mounting with a backing plate.

DISCLOSURE OF THE INVENTION

In accordance with the present invention, a roof rack section includes a mounting plate secured to each of two lateral edges of a vehicle roof. Each mounting plate has two outwardly protruding support pins. The foot plate of the roof rack section has two cups or slots sized and located to receive and trap the pins. Locking means are provided to lock the foot plate in its trapping position.

Attached to each foot plate is a leg section, which is in turn attached to a beam positioned transversely above the vehicle roof. A means for drawing together the transverse beam and the leg sections is provided.

The drawing together means preferably comprises a screw having a knob end located outwardly of the leg section and a shank extending transversely through the leg section and into a hollow interior of the transverse beam, and engaging a threaded nut secured to the inside of said transverse beam.

DESCRIPTION OF THE DRAWINGS

FIG. 1 is a perspective view of a roof rack of the present invention mounted on a vehicle roof.

FIG. 2 is an exploded perspective view of a movable end of a first embodiment of the present invention.

FIG. 3 is a cross-sectional view of a movable end of a first embodiment of the present invention.

FIG. 4 is a close-up side plan view of a foot plate positioned for mounting on a mounting plate in the first embodiment of the present invention.

FIG. 5 is a plan view of a foot plate of the first embodiment of the present invention.

FIG. 6A is an elevation view of a first variation of the mounting plate of the first embodiment of the present invention.

FIG. 6B is a side plan view of a first variation of the mounting plate of the first embodiment of the present invention.

FIG. 7A is a perspective view of a leg section and a transverse beam of the present invention having an elliptical transverse beam.

FIG. 7B is an omega shaped embodiment of the nut used in the elliptical transverse beam.

FIG. 8A is an elevation view of a second variation of the mounting plate of the first embodiment of the present invention.

FIG. 8B is a side plan view of a second variation of the mounting plate of the first embodiment of the present invention.

FIG. 14 is an exploded perspective view of a second variation of a third embodiment of the present invention.

FIG. 15 is a perspective view of the embodiment of FIG. 14.

BEST MODE FOR CARRYING OUT THE INVENTION

Figure 9:
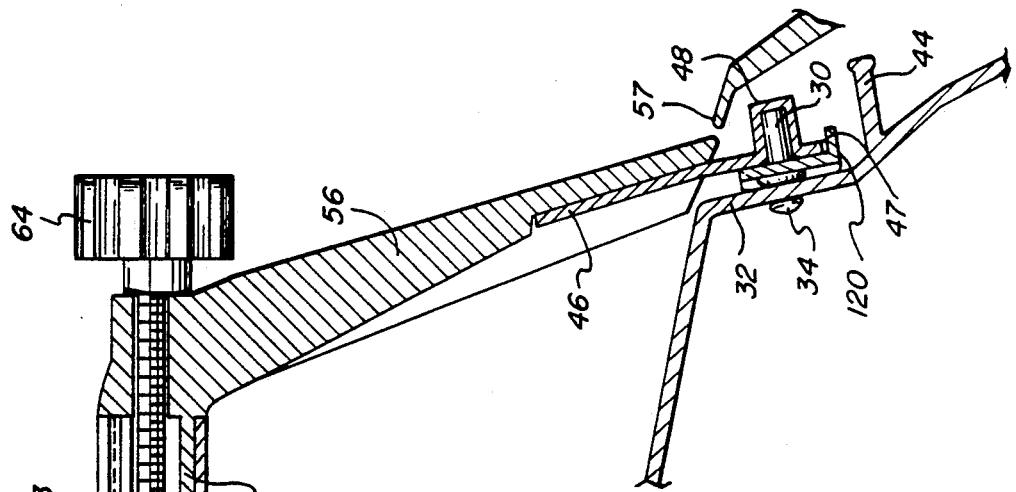
FIG. 9 is a cross sectional view of a movable end of a roof rack section of the first embodiment of the present invention.

The present invention provides a quickly and easily mounted roof rack.

As used herein a "roof rack section" is one of a plurality of such sections which together form a roof rack. Typically there are two such sections mounted transversely on the front and rear of a vehicle roof.

Referring now to the first embodiment of the invention disclosed in FIGS. 1–9, a mounting plate 20 is a rectangular metal plate having a lip 22 along one longitudinal edge. In the first variation of the mounting plate 20 shown in FIGS. 6A and 6B the mounting plate is formed so that its ends 24 are in a plane located outwardly from the mounting plate's middle portion 26 when mounted on a vehicle roof return 32 as shown in FIG. 4. The gap between the planes of the inward face of the middle portion 26 of the backing plate and the inward face of the ends 24 allows the head 28 of a pin 30 to be fitted between the mounting plate and a vehicle roof return 32 so that the mounting plate 20 presents a flush inward surface for fastening to a vehicle, as shown in FIGS. 2, 3 and 4. In each mounting plate there are at least two such pins 30. The mounting plate has two openings 33 in its middle portion 26. These openings 33 receive two blind rivets 34, as shown in FIG. 2, which are inserted through the openings 33 and into corresponding openings in the roof return 32 of the motor vehicle to fasten the mounting plate 20 to the motor vehicle roof return 32, as shown in FIGS. 3 and 4.

In a second variation of the mounting plate 120 shown in FIGS. 8A, 8B and 9, the pins 30 are located in the middle portion 126 of the mounting plate 120. The middle portion 126 of mounting plate 120 is in a plane located outwardly of the plane of the ends 124 of the mounting plate 120 to allow for the heads 28 of pins 30 to be fitted in the space between the mounting plate 120 and the vehicle roof return 32. Blind rivets are inserted through the openings 133 in the ends 124 of the mounting plate 120 to fasten the mounting plate 120 to the vehicle roof return 32.

The mounting plates 20 or 120 may be used as a template to precisely locate drill holes for the rivets 34.

Typically there will be a pair of such mounting plates 20 or 120 riveted to the roof returns 32 on opposite lateral edges of the vehicle underneath a vehicle door lip 57 to support each roof rack section.

The mounting plate serves to strengthen the roof return 32 to support the roof rack. In the present invention the pins 30 and mounting plates 20 or 120 are intended to support the entire weight of the roof rack section and the articles carried thereon. As shown in FIG. 9 the pins 30 support this load. The invention is not limited to the configurations shown in FIGS. 3 and 4 to a mounting plate having a lip 22 resting on the drip molding 44 for its effectiveness, although the mounting plate may be so located to improve the strength of the roof rack mounting.

As shown in FIGS. 3 and 4, the inward face of a foot plate 46 seats onto the protruding pins 30 of the mounting plate 20 or 120 when the roof rack section is mounted onto the roof. As shown in FIG. 5, foot plate 46 is provided with outwardly extending cups 48 which are open on their inward facing end; the cups 48 are sized and spaced to receive the pins 30. The lower edge 47 of the foot plate 46 may be supported by the lip 22, as shown in FIGS. 3 and 4, but this is not necessary to the effectiveness of the mounting system, which is designed so that the pins 30 and cups 48 are sufficient to support the roof rack load, as shown in FIG. 9.

The foot plate 46 shown in FIG. 5 is generally an upside down T-shape, and has the cups 48 located on its horizontal segment 50, and has holes 52 on its vertical segment 54 for fastening to a leg section 56 by rivets or other fastening means. Of course other shapes may be used to serve the same foot plate function within the scope of the invention.

The pins 30 and the cups 48 when fitted together should have a total length less than the clearance between the roof return 32 and the portion of the upper door lip 57 covering the mounting plate 20 or 120 when the door is closed. However, the optimum length is one in which the outward end 53 of the cup 48 just clears the inner surface 59 of the door lip 57 when the door is closed. This length provides security against theft when the doors are closed and locked by preventing the leg section from being backed out from the mounting plate pins 30. The design also prevents accidental dislodgment of the roof rack when the vehicle is traveling at high speeds.

The leg section 56 may be provided with a base plate 58 made from a resilient polymeric material to avoid marring or scratching a vehicle's exterior finish, as shown in FIGS. 2 and 3. However, the base plate is not intended to support the roof rack load, and may be omitted to provide a roof rack which is completely supported above the horizontal roof surface, as shown in FIG. 9.

The leg section 56 extends upwardly and may be angled inwardly at approximately 15 degrees. Leg section 56 has an arm 60 which fits into the open end of a hollow transverse beam.

The hollow transverse beam may be a generally rectangular or square channel, shown as 162 in FIGS. 1 and 2, or may be a generally elliptical channel, shown as 62 in FIG. 7A and in FIG. 9. The use of a generally elliptical channel (the term "elliptical" is intended to refer also to other similar shapes, such as ovals, hyperboloids, paraboloids and other streamlined shapes) is preferred because of its superior aerodynamic characteristics. In either case the beam is preferably manufactured from extruded aluminum.

Fitted into the channel of the transverse beam are accessory mounting plates 100, having mounting means for securing accessory hold—downs to the transverse beam. Preferably the mounting means comprise a plate located in the channel of the transverse beam with a threaded stud 102 extending upwardly through the open side of the channel beam from the mounting plate 100. The threaded stud fits into threaded sockets in accessories such as ski hold downs, or sailboard holders.

For each roof rack section, one leg section 56 is movably attached to the transverse beam and incorporates means for drawing together the movable leg section 56 and the transverse beam 62 or 162, in order to clamp the foot plates 46 against the mounting plates 20 or 120 to secure the roof rack to the vehicle. The other leg section may be permanently fastened to the other end of the transverse beam, as shown for example in FIG. 1, where leg section 156 is permanently fastened to the end of transverse beam 162.

A preferred embodiment of the drawing together means is shown in FIGS. 2 and 3 as a screw 63 extending transversely through the movable leg section 56, with a knob end 64 located outwardly of the leg section. The threaded shank 66 of the screw extends through an aperture 67 in the leg section 56 and engages a nut 68 which is secured to the interior of the transverse beam. The shank end 66 of the screw 63 has a stop 69 to prevent the screw 63 from being withdrawn from the nut.

In the elliptical embodiment of the transverse beam shown in FIGS. 7A and 9, the nut may be either of two alternate embodiments. In one embodiment the nut 68, shown in FIG. 7A, is a curved piece of metal 70 having a curvature parallel to the curvature of the elliptical channel and having on opposite edges two upright segments 71 in which there are threaded holes to receive the screw 63. In a second embodiment, shown in FIG. 7B as 168, the nut is an omega shaped metal plate 72 threaded in its circular segment 74, and having curved extending segments 76 on either side of the circular segment 74.

In the square channel embodiment 162 of the transverse beam, a square nut 268 may be used to engage the screw 63, as shown in FIG. 2.

The provision for a movable leg section and the drawing together means allows for a sufficient amount of movement so as to clamp the foot plates 46 against the mounting plates, and also allows for loosening the foot plates 46 to dismount the roof rack section. In addition, the movable leg section allows mounting of accessory mounting plates 100 into the channel of the transverse beam.

Figure 11:
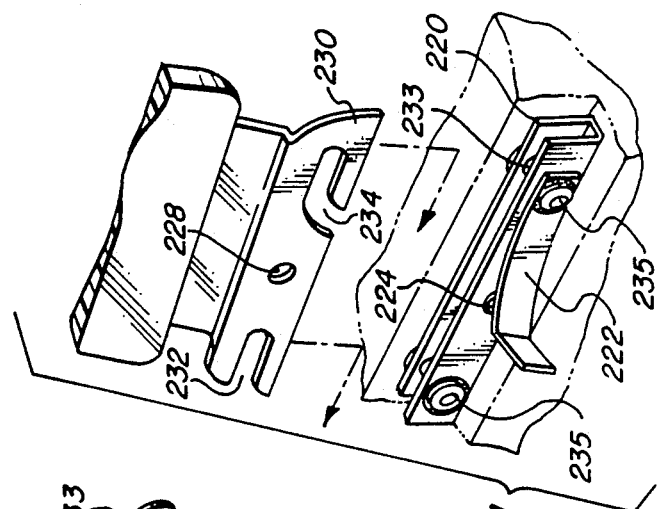
FIG. 11 is a perspective view of the second embodiment shown in FIG. 10.
Figure 10:
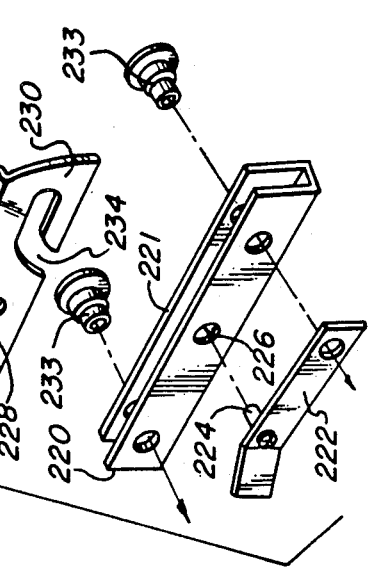
FIG. 10 is an exploded perspective view of a second embodiment of the present invention.

In the second embodiment of the roof rack section shown in FIGS. 10 and 11, the mounting plate embodiment 220 is preferably a generally U-shaped channel. Tubular rivets or pins 233 traverse the space between the upwardly extending arms 221 of the U-shaped mounting plate 220. Alternatively, other pins may be used in the space between the arms 221.

A foot plate 230 has two slots cut in it. Straight slot 232 is formed with an open end in one side edge of the foot plate 230 and extends parallel to the bottom edge of foot plate 230. Curved slot 234 is formed with an open end at the bottom edge of foot plate 230 and extends upwardly and is curved so that its closed end is parallel to the bottom edge of foot plate 230. Both slots are sized to receive the outer diameter of pins 233.

Locking means are provided to lock the foot plates 230 in place when mounted on the pins 233. A spring steel plate 222 is fastened to the mounting plate 220 on its outward surface at one end. The spring steel plate 222 has a locking pin 224 which points inwardly and passes through an opening 226 in the outward side of the mounting plate 220, and into a second opening 228 in the foot plate 230 when the foot plate 230 is fitted onto the mounting plate 220.

A roof rack section using the second embodiment is mounted on the car as shown in FIG. 11. The mounting plate assembly 220 is riveted to the roof return of a vehicle by blind rivets 235 that pass through the interior tubular bore of the tubular pins 233 to engage the roof return. The straight slot 232 is placed in the channel of the mounting plate assembly 220 in front of one tubular pin 233, and the curved slot 234 is placed onto another tubular pin 233. The foot plate assembly 230 then slides sideways until the pins 233 reach the closed ends of each slot, trapping the foot plate 230 in position. The pin 224 is inserted into the opening 226 and the opening 228 to prevent accidental disengagement.

The second embodiment of the roof rack section will further include leg sections, a transverse beam, and drawing together means as already variously described in reference to the first embodiment. If desired to obtain a slimmer profile, the mounting plate of the second embodiment may be a flat or L-shaped plate, and the spring steel plate 222 with the locking pin 224 may be affixed to the leg section 256, as will be described in reference to the third embodiment. As discussed in reference to the first embodiment, the support pins are adapted to support the entire weight of the roof rack section, although the U-shaped or L-shaped mounting plate may also be used to support the roof rack section on its horizontally extending surfaces for additional support if desired.

The second embodiment thus provides an additional measure of security by the provision of locking means. As in the first embodiment, the mounting plate 220 and the foot plates 230 when fitted together should have a total width less than the clearance between the roof return and the portion of the upper door lip covering the mounting plate and foot plate when the door is closed. This length provides security against theft when the doors are closed and locked by preventing the removal of the pin 224 which prevents sliding of the foot plates relative to the mounting plate. The design also minimizes accidental dislodgment of the roof rack when the vehicle is traveling at high speeds.

The third embodiment shown in FIGS. 12-15 varies slightly from the second embodiment in that keyhole shaped slots are used instead of the combination of curved and parallel slots. In the first variation of the third embodiment shown in FIGS. 12-13, the keyhole slot is horizontally oriented; in the second variation shown in FIGS. 14-15, the keyhole slot is vertically oriented.

Figure 12:
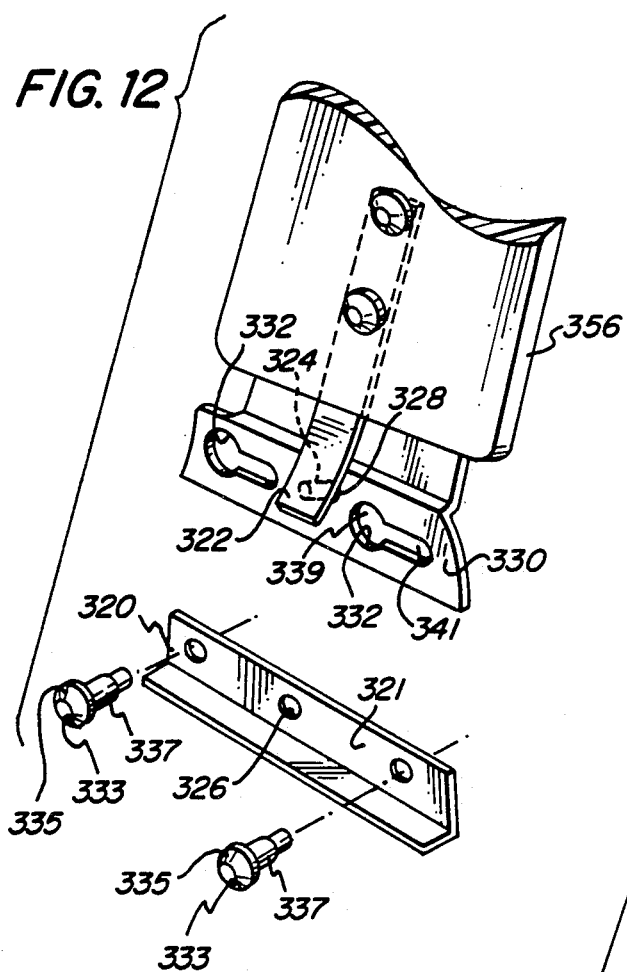
FIG. 12 is an exploded perspective view of a first variation of the third embodiment of the present invention.
Figure 13:
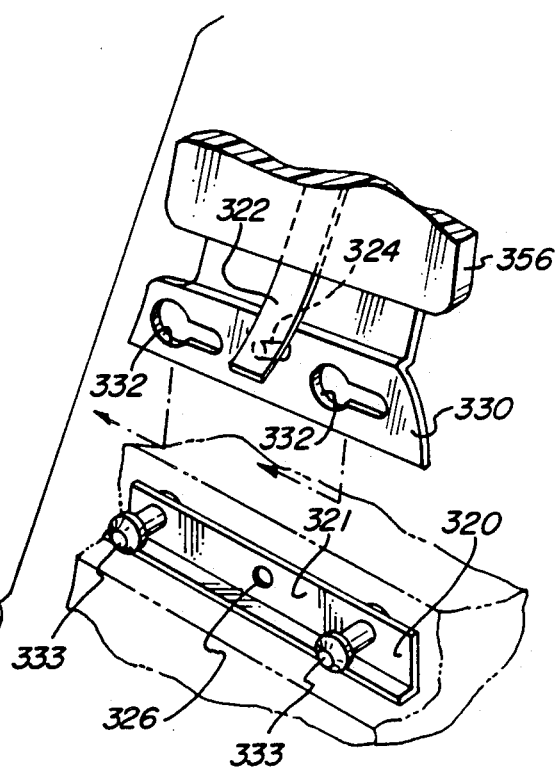
FIG. 13 is a perspective view of the embodiment shown in FIG. 12.

Referring now to FIGS. 12-13, the mounting plate 320 of the first variation of the third embodiment is preferably a generally flat or L-shaped plate. Tubular rivets or pins 333 extend outwardly from the plate 321. Pins 333 are provided with heads 335 which are larger in diameter than the bodies 337 of the pins 333.

A foot plate 330 has two keyhole shaped slots 332 formed in it. Keyhole shaped slots 332 are horizontally oriented and have a larger diameter end 339 sized to receive the heads 335 of the pins 333, and a smaller diameter end 341 which are smaller than the heads 335 but which are sized to receive the bodies 337 of the pins 333. The thickness of the foot plate 330 will be about equal to or slightly less than the length of the bodies 337 of the pins 333.

Locking means are provided to lock the foot plates 330 in place when mounted on the plate 320. A spring steel plate 322 is fastened to the leg 356 and extends generally downwardly towards the foot plate 330. The spring steel plate 322 has a locking pin 324 which points inwardly and passes through an opening 328 in the foot plate 330 and into another opening 326 in the mounting plate 320 when the foot plate 330 is mounted onto the mounting plate 320.

A roof rack section using the third embodiment is mounted on the car as shown in FIG. 13. The mounting plate assembly 320 is riveted to the roof return of a vehicle by blind rivets that pass through the interior tubular bore of the tubular pins 333 to engage the roof return. The large end 339 of the keyhole slots 332 are fitted over the heads 335 of the pins 333 until the foot plate 330 clears the heads 335, and then the foot plate 330 slides sideways until the pins 333 reach the closed smaller diameter end of each slot 332, trapping the foot plate 330 in position. The pin 324 is inserted into the openings 328 and 326 to prevent accidental disengagement.

Referring now to FIGS. 14-15, the mounting plate 420 of the second variation of the third embodiment is preferably a generally flat or L-shaped plate. Tubular rivets or pins 433 extend outwardly from the plate 421. Pins 433 are provided with heads 435 which are larger in diameter than the bodies 437 of the pins 433.

A foot plate 430 has two keyhole shaped slots 432 formed in it. Keyhole shaped slots 432 are vertically oriented and have a larger diameter end 439 sized to receive the heads 435 of the pins 433, and a smaller diameter end 441 which are smaller than the heads 435 but which are sized to receive the bodies 437 of the pins 433. The thickness of the foot plate 430 will be about equal to or slightly less than the length of the bodies 437 of the pins 433.

Locking means are provided to lock the foot plates 430 in place when mounted on the plate 420. A spring steel plate 422 is fastened to the leg 456 and extends generally downwardly towards the foot plate 430. The spring steel plate 422 has a locking pin 424 which points inwardly and passes through an opening 428 in the foot plate 430 and into another opening 426 in the mounting plate 420 when the foot plate 430 is mounted onto the mounting plate 420.

A roof rack section using the third embodiment is mounted on the car as shown in FIG. 15. The mounting plate assembly 420 is riveted to the roof return of a vehicle by blind rivets that pass through the interior tubular bore of the tubular pins 433 to engage the roof return. The large end 439 of the keyhole slots 432 are fitted over the heads 435 of the pins 433 until the foot plate 430 clears the heads 435, and then the foot plate 430 slides vertically until the pins 433 reach the closed smaller diameter end of each slot 432, trapping the foot plate 430 in position. The pin 424 is inserted into the openings 428 and 426 to prevent accidental disengagement.

The third embodiment of the roof rack section will further include leg sections, a transverse beam, and drawing together means as already variously described in reference to the first embodiment. As discussed in reference to the first embodiment, the pins are adapted to support the entire weight of the roof rack section, although a lip may be provided on the mounting plate for additional support if desired.

The third embodiment thus provides a very slim profile which improves roof rack aerodynamics and improved mounting safety, making it possible to provide a roof rack mounting of about 0.06 inches thickness, which permits mounting of the rack even in situations were there are very close clearances between the door lip and a roof return. As in the first and second embodiments, this width provides security against theft when the doors are closed and locked by preventing the removal of the pin 324 or 424 which prevents sliding of the foot plates relative to the mounting plate, and also increases safety by minimizing accidental dislodgment of the roof rack.

What is claimed is:

1. A roof rack section for motor vehicles, said motor vehicles having roof returns on sides of a vehicle roof, the roof returns having outwardly extending support pins each having a body and a head of larger cross-section than a cross-section of the body, comprising:

a transverse beam, transverse beam support means having leg sections for joining to said transverse beam at spaced apart locations and having foot portions with closed slots; said slots being shaped to have first portions sized to receive the heads of the support pins and second smaller sized portions sized and located to receive the bodies of said support pins so as to trap the foot portions; the transverse beam support means thereby supporting the transverse beam without placing a load on the roof of the motor vehicle; and releasable locking means to prevent the foot portions from sliding relative to the support pins and escaping therefrom;

whereby said roof rack section may be conveniently mounted to said roof return without contacting or placing a load on the vehicle roof by locating said slots on the support pins and moving said foot portions relative to the support pins until said foot portions are locked in place by said locking means.

2. A roof rack section as claimed in claim 1 wherein said slots in said foot portions comprises keyhole shaped slots.

3. A roof rack section as claimed in claim 2 wherein said keyhole shaped slots are horizontally oriented.

4. A roof rack section as claimed in claim 2 wherein said keyhole shaped slots are vertically oriented.

5. A roof rack section in accordance with claim 1 wherein said locking means comprise locking pins, and wherein said foot portions and said roof return have openings located thereon, and wherein said locking pins are spring biased to enter said openings to lock said foot portions in their trapped positions.

6. A roof rack section as claimed in claim 1 wherein at least one of the leg sections and said transverse beam are movable in relation to each other; and further comprising means for drawing said transverse beam and said at least one movable leg section together.

7. A roof rack section in accordance with claim 6 wherein said transverse beam comprises an open channel beam and wherein said drawing together means comprises:

a screw having a knob end located outwardly of said at least one movable leg section and having a threaded shank extending transversely through said at least one movable leg section and into the inside of said transverse beam; and a threaded nut for receiving said threaded shank secured inside and to said channel beam.

8. A roof rack section as claimed in claim 7, further comprising accessory hold down means slidably fitted inside said transverse beam.

9. A roof rack section as claimed in claim 1 further comprising mounting plates affixed to said roof return having said support pins extending outwardly therefrom.

10. A roof rack section as claimed in claim 9 wherein said support pins are tubular and have fastener means extending therethrough to affix the mounting plates to the vehicle roof.

11. A roof rack section as claimed in claim 7 wherein said motor vehicle has closable doors having upper lips and said roof returns are bounded at their lower ends by drip molding so as to define a concealed space behind said upper lips; and wherein said mounting plates and support pins are sized sufficiently small so as to fit within said concealed space without interfering with the closure of said doors.

12. A roof rack section for motor vehicles, said motor vehicles having roof returns on sides of a vehicle roof, the roof returns having outwardly extending support pins each having a body with a cross-section and a head with a greater cross-section than that of said body, comprising:

an open channel transverse beam;

transverse beam support means having leg sections for joining to said transverse beam at spaced apart locations and having foot portions having closed slots having larger ends sized to receive the heads of the support pins and smaller ends sized and located to receive the bodies of said support pins to trap the foot portions to support the transverse beam without placing a load on the roof of the motor vehicle, said foot portions each having an opening therein for receiving a locking pin, at least one of the leg sections and said transverse beam being movable in relation to each other;

releasable spring biased locking pins located to enter said foot portion openings to lock said foot portions in their trapped positions;

means for drawing said transverse beam and said at least one movable leg section together;

whereby said roof rack section may be conveniently mounted to said roof return without contacting or placing a load on the vehicle roof by locating said slots on the support pins and moving said foot portions relative to the support pins until said foot portions are trapped and said locking pins lock said foot portions in place.

13. A roof rack section as claimed in claim 12 wherein said closed slots are oriented so as to receive and trap the bodies of said support pins by movement of said foot portions in a generally horizontal direction.

14. A roof rack section as claimed in claim 13 wherein said closed slots are oriented with their smaller ends extending forwardly.

15. A roof rack section as claimed in claim 13 wherein said closed slots are generally keyhole shaped.

16. A roof rack section as claimed in claim 12 wherein said closed slots are oriented so as to receive and trap the bodies of said support pins by movement of said foot portions in a vertical direction.

17. A roof rack section as claimed in claim 16 wherein said closed slots are oriented with their smaller ends extending downwardly.

18. A roof rack section as claimed in claim 16 wherein said closed slots are generally keyhole shaped.

* * * * *